United States Patent [19]
Dewolf

[11] Patent Number: 5,367,413
[45] Date of Patent: Nov. 22, 1994

[54] DEVICE FOR REPRODUCING A PIECE OF MUSIC FROM A MAGNETIC RECORD CARRIER (FAVORITE TAPE POSITION)

[75] Inventor: Jan Dewolf, Eindhoven, Netherlands

[73] Assignee: U.S. Philips Corporation, New York, N.Y.

[21] Appl. No.: 212,331

[22] Filed: Mar. 14, 1994

Related U.S. Application Data

[63] Continuation of Ser. No. 849,562, Mar. 11, 1992, abandoned.

[30] Foreign Application Priority Data

Mar. 18, 1991 [NL] Netherlands ............ 9100475

[51] Int. Cl.⁵ ............................ G11B 15/22
[52] U.S. Cl. ............................ 360/72.2
[58] Field of Search ............... 360/72.2

[56] References Cited

U.S. PATENT DOCUMENTS 4,890,171 12/1989 Nagao ..................... 360/72.2
5,101,302 3/1992 Schönthaler et al. ........ 360/72.2

FOREIGN PATENT DOCUMENTS

0346979 12/1989 European Pat. Off. ........ 360/72.2

*Primary Examiner*—Edward K. Look
*Assistant Examiner*—Christopher Verdier
*Attorney, Agent, or Firm*—Edward W. Goodman

[57] ABSTRACT

A device for reproducing music includes a non-volatile memory for storing, for two or more magnetic record carriers (2), a start position signal for a favorite piece of music on each one of these record carriers. The device further including an address signal generator (29) for generating an address signal in conformity with the record carrier inserted into the device, and an operating circuit (39) for generating an activation signal upon operation of the operating circuit. If a user has listened to a record carrier, an FTP mode can be switched on by operating the operating circuit (37), while the memory (25) is adapted to supply the start position signal at an output (37) in response to the address signal, the start position signal being stored in the memory for this one piece of music on the record carrier inserted into the device. The output (37) of the memory is coupled to an input (22) of a comparator for applying the start position signal to the comparator, while another input (21) of the comparator (20) receives a position signal in conformity with the current position of the reproducing head (1) with respect to the record carrier. The device further includes a transport control circuit (9) adapted to transport the record carrier at a raised transport speed to the start position of the piece of music in response to the control signal at an output (43) of the comparator and in response to the activation signal, and to switch off the transport after the start position of the piece of music has been reached.

21 Claims, 3 Drawing Sheets

DEVICE FOR REPRODUCING A PIECE OF MUSIC FROM A MAGNETIC RECORD CARRIER (FAVORITE TAPE POSITION)

This is a continuation of application Ser. No. 07/849,562, filed on Mar. 11, 1992, now abandoned.

BACKGROUND OF THE INVENTION

1. Field of the Invention

The invention relates to a device for reproducing a piece of music from a track on a magnetic record carrier incorporated in a cassette, comprising reading means for reading the piece of music from the track at a reproduction speed, which reading means comprise a reproducing head, position detection means for detecting the position of the reproducing head with respect to the record carrier, viewed in the longitudinal direction of said record carrier, and for supplying a position signal which is related to said position, comparator means having a first and a second input and an output for comparing the position signal applied to the first input with a start position signal which is related to the start position of a piece of music on the record carrier and which is applied to the second input, and for supplying a control signal at the output in dependence upon the position signal and the start position signal, and transport control means for transporting the record carrier along the reproducing head in a reproduction mode at the reproduction speed and for transporting the record carrier in a second mode at a raised transport speed in response to the control signal of the comparator means to such a position that the reproducing head is approximately situated at the start position of the piece of music.

2. Description of the Related Art

A device of this type is known in the form of the magnetic tape cassette recorders which are currently available on the market.

It is possible to select a given piece of music by supplying a start position signal via a keyboard, which signal may be in the form of, for example, a count of a tape counter present in the device. The record carrier is subsequently transported at the raised speed to the starting point of this piece of music on the record carrier, whereafter it is possible to change over to the reproduction speed and reproduce the piece of music. Such a device has the drawback that the transport to the starting point of a piece of music to be reproduced sometimes takes a long time, particularly if the actual position of the reproducing head with respect to the record carrier and the start position are far apart. This is in contrast to the known compact disc digital audio players with which a much faster access is possible in substantially all cases.

SUMMARY OF THE INVENTION

The invention has for its object to provide a magnetic tape reproducing device with which it is possible to reproduce a favorite piece of music rapidly after switching on the device, thus precluding a long search time.

To this end the device according to the invention is characterized in that it further comprises non-volatile memory means for storing, for two or more record carriers, a start position signal for one piece of music on each one of said record carriers, operating means for generating an activation signal upon operation of the operating means, and address signal generator means adapted to generate an address signal in accordance with the record carrier inserted into the device for supplying the address signal to the memory means, in that the memory means are adapted to supply the start position signal at an output in response to the address signal, which start position signal is stored in the memory means for said one piece of music on the record carrier inserted into the device, in that an output of the memory means is coupled to the second input of the comparator means for supplying the start position signal to the comparator means, and in that the transport control means are adapted to transport the record carrier at the raised transport speed to the start position of the piece of music in response to the control signal of the comparator means and in response to the activation signal, and to switch off the transport after the start position of the piece of music has been reached.

The invention is based on the recognition that a user who switches on the device and has inserted a record carrier will preferably want to listen to a favorite piece of music first, without having to wait too long before the reproducing device has found the starting point of the favorite piece of music. To enable the user to realize this, the record carrier incorporated in the cassette must have been wound in the cassette in such a way that, upon insertion of the record carrier, the reproducing head is already situated in such a position with respect to the record carrier that this position approximately corresponds to the start position of the favorite piece of music. The device can then be directly switched to the reproduction mode so that the favorite piece of music can be reproduced immediately.

To achieve this, the user should operate the operating means after he has listened to a record carrier. The memory means comprise the start position signal associated with the user's favorite piece of music on this record carrier. These memory means also comprise other start position signals associated with the user's other favorite pieces of music on other record carriers, one for each record carrier. After the operating means have been operated, the memory means will supply the start position signal for the favorite piece of music in response to the control signal and the address signal, after which the device will transport the record carrier to this position. The transport is subsequently switched off. The user could then eject the cassette. If the user wants to listen to the record carrier some other time, the record carrier incorporated in a cassette can then be inserted into the device and the device can be directly switched to the reproduction mode whereafter the favorite piece of music is reproduced. Consequently, in this case no search time is necessary to find the start position of the favorite piece of music.

The user can generate the address signal in the address signal generator means, for example, by entering a cassette-characterizing code via a keyboard. In fact, the user knows which cassette has been inserted and can thus enter the associated code. This code may be, for example, a unique number associated with this cassette.

It is alternatively possible for the device itself to generate the address signal automatically. To this end the device may be characterized in that the address signal generator means comprise recognition means adapted to recognize the record carrier inserted into the device and to generate an address signal in conformity with the record carrier recognized by the recognition means. A record carrier may be recognized in different manners. It would be feasible to use a unique code provided on the cassette, which code could be detected by the device with the aid of mechanical, optical or magnetic-/electrical means. Another possibility is the use of a catalogue number or identification code for the record carrier, which number or code may be incorporated in the sub-code signal on the record carrier. These possibilities can be used for record carriers on which the audio signal is recorded in a digital format in accordance with the RDAT or the SDAT principle, or another format such as the DCC format. A further possibility is the use of a given number of bytes as a recognition signal, viz. those bytes that are unique in the table of contents (TOC) which is also incorporated in the subcode. Such a method of recognizing record carriers is extensively described in EP 169.597 (PHN 11.078) corresponding to U.S. Pat. No. 4,779,252.

If the device is used by two users, it may be further characterized in that the non-volatile memory means comprise first non-volatile memory means for storing, for said two or more record carriers, the start position signal for one piece of music on each one of said record carriers, second non-volatile memory means also for storing, for two or more record careers, a start position signal for one piece of music on each one of said record carriers, said first and second memory means being adapted to supply, in response to the address signal, the start position signal at an output for the one piece of music referred to as first or second piece of music on the record carrier inserted into the device, in that the device further comprises selection signal generator means having an output for supplying a first or a second selection signal, which output is coupled to an input of memory means-associated selection means adapted to supply the start position signal at the output of the memory means in response to the first or the second selection signal, which start position signal is stored in the first or the second non-volatile memory means at a memory location in conformity with the address signal applied to the memory means. The start positions of the second user's favorite pieces of music can then be stored in the second non-volatile memory means for the different record carriers, one again for each record carrier. In this case it may occur that the first user inserts a record carrier into the device which has been the last record carrier played by the second user. In that case the wrong favorite piece of music may be at hand. The first user should now operate the selection signal generator means and the operating means so that the record carrier can as yet be wound to the start position of the first user's favorite piece of music.

It is of course evident that the device could be extended with a third or even more non-volatile memory means so that more users can store their favorite pieces of music for two or more record carriers in the device. However, it is obvious that the object as envisaged by the invention, viz. the fast reproduction of a piece of music, will become less and less manifest as a larger number of users can store their favorite pieces of music in the device. However, the advantage is maintained that it is possible for the users to designate a favorite piece of music on a record carrier and to store the relevant information in the device.

For loading the start position of a favorite piece of music on a record carrier in the non-volatile memory means, the device may be characterized in that it further comprises third memory means for storing a table of contents comprising information about the sequence of pieces of music on a record carrier inserted into the device, and start position signals which are related to the start positions of the pieces of music on the record carrier, said third memory means having an output which is coupled to an input of the non-volatile memory means, second operating means for generating a selection signal upon operation of said operating means, which signal is related to the information about the sequence associated with one of the pieces of music on the record carrier, for supplying said selection signal to the third memory means, in that the third memory means are adapted to supply the start position signal of one of the pieces of music at the output in response to the selection signal and in that the non-volatile memory means are adapted to store, in response to a load signal, the start position signal at a location in the memory means which corresponds to the address signal of the address signal generator means. If the device is again used by more than one user, the device may be characterized in that the non-volatile memory means are adapted to store the start position signal in the selected first and second non-volatile memory means in response to the load signal and the first or the second selection signal, respectively.

It is to be noted that a magnetic tape reproducing device is known from the published Netherlands Patent Application no. 7207887 in which the magnetic tape is automatically brought to a start position where it comes to a standstill after the information on this tape has been reproduced. In the known device, marks provided on the record carrier are used for this purpose.

BRIEF DESCRIPTION OF THE DRAWING

The invention will be described in greater detail by way of a number of embodiments with reference to the following description of the Figures. Components having the same reference numerals in the different Figures are identical. In the description of the Figures.

DESCRIPTION OF THE PREFERRED EMBODIMENTS

Figure 1:
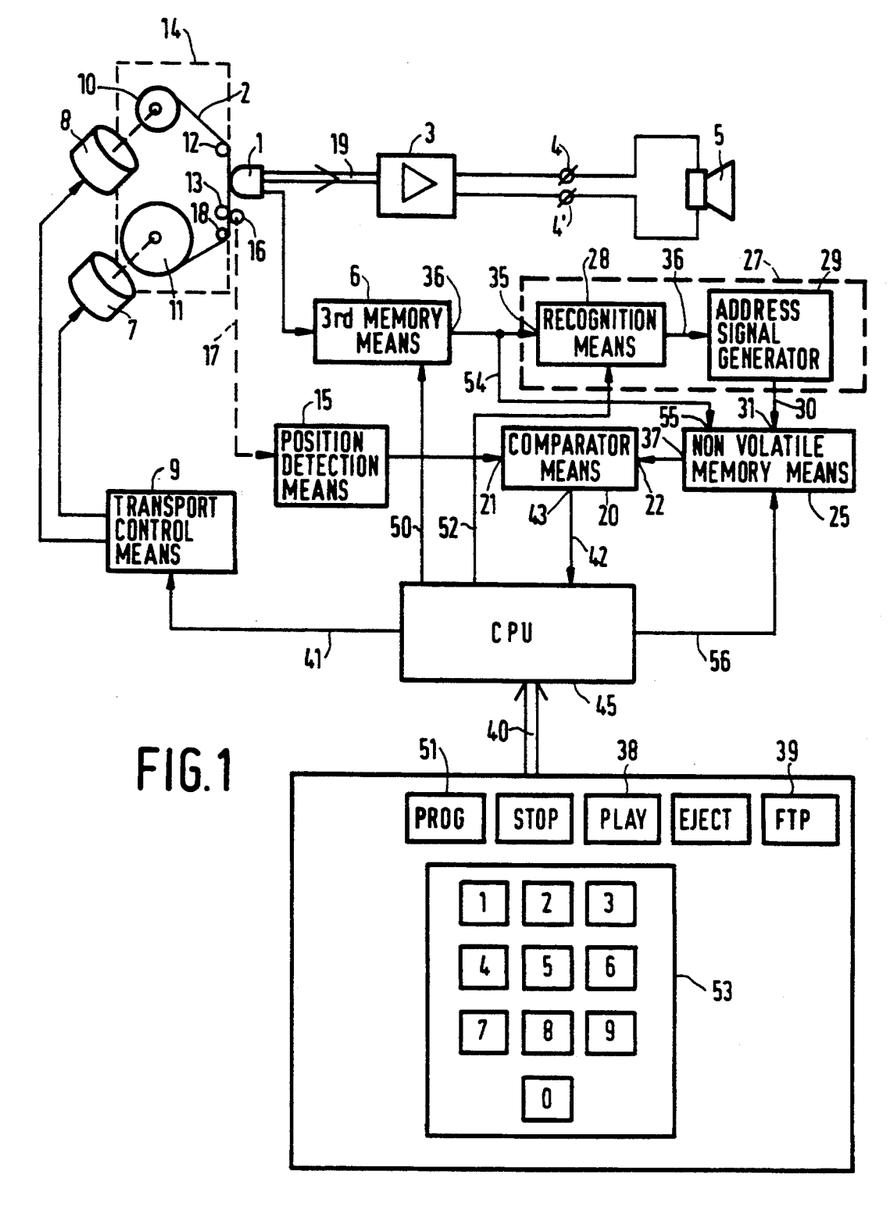
FIG. 1 shows a first embodiment of a reproducing device incorporating the invention.

FIG. 1 shows diagrammatically the device according to the invention. The device includes reading means comprising a reproducing head 1 for reading pieces of music from a magnetic record carrier 2 which is incorporated in a cassette 14. The reproducing head 1 is electrically coupled to an amplifier circuit 3. A loudspeaker 5 may be connected to the output 4—4' of the amplifier circuit so that the pieces of music read from the record carrier can be made audible.

In its use as a reproducing device of the SDAT type or the DCC type, the reproducing head is a multitrack reproducing head which is adapted to read information from a plurality of longitudinally juxtaposed tracks on the record carrier. Particularly in the embodiment of the novel DCC digital compact cassette standard, as described, for example in Netherlands Patent Application no. 90.00.039 (PHN 13.209) corresponding to U.S. patent application Ser. No. 598,287, filed Oct. 16, 1990, now U.S. Pat. No. 5,117,313, each side of the record carrier has eight parallel tracks for recording a digital audio signal and an additional auxiliary track for recording additional information such as a sub-code. The digital audio information is read from the eight tracks and applied via the multiple lead 19 to the amplifier 3 which also comprises a decoding unit for decoding the digital audio information.

The device further comprises tape transport control means, with reel drive motors 7 and 8 and a control circuit 9. In this embodiment it has been assumed that the tape transport is only effected by means of the motors 7 and 8. However, a capstan 13 which cooperates with a pressure roller 16 may alternatively be present, the reproduction speed being realized by rotation of the capstan 13.

When driven by a reel, for example, the reel 10, the record carrier is transported via the guide rollers 12 and 18 to the second reel 11. The device may be of the autoreverse type. In that case the record carrier will be transported in the opposite direction along the reproducing head.

Position detection means 15, 16, 17 are provided for detecting the position of the reproducing head 1, viewed in the longitudinal direction of the record carrier 2. These detection means may be realized in different manners. FIG. 1 shows an idler wheel 16 operating in synchronism with the transport of the record carrier 2 and cooperating with a tachogenerator (not shown). Such a tachogenerator supplies tachopulses while the wheel 16 is rotating. These tachopulses are applied via the lead 17 to a counter which is incorporated in the block 15.

If the counter has been set to zero at the start of the record carrier, the count is subsequently a measure of the position of the reproducing head 1, viewed in the longitudinal direction of the record carrier, with respect to this record carrier.

Other position detection means are described, for example, in German Patent Applications 27.30.134, 28.53.025 and 29.51.816 (Staar) corresponding, respectively, to U.S. Pat. No. 4,172,231 (RE 30,939); U.S. Pat. Nos. 4,366,371; 4,398,300; 4,408,335; and 4,411,008; and U.S. Pat. No. 4,357,643. In all these cases tachopulses are counted, which pulses are generated by tachogenerators coupled to the two reels. A further position detection method is to read the time code information incorporated in the sub-code in a track on the record carrier, for example, in a device of the SDAT type or the DCC type, and to derive the position of the reproducing head with respect to the record carrier from this information. This time code information may be, for example, in the form of an absolute time indicating the transport time required to reach a certain position in the longitudinal direction of the record carrier from the start of the record carrier at the reproduction speed.

The device further comprises memory means 6 for storing a table of contents (TOC), comprising sequential numbers of the pieces of music on the record carrier (the track numbers) and start position signals which are related to the start positions of the pieces of music on the record carrier. This table of contents may be recorded, for example, on the record carrier 2 itself. The previously mentioned Netherlands Patent Application no. 90.00.039 (PHN 13.209) (U.S. Pat. No. 5,117,313) states, for example, that the table of contents is incorporated in the sub-code in a ninth track on the record carrier. By reading the additional information from this ninth track, the table of contents can be derived therefrom and applied to the memory 6.

The device further comprises comparator means 20 having a first input 21 which is coupled to the output of the position detection means 15 and a second input 22 which is coupled to an output 37 of first memory means 25. The memory means 25 are non-volatile memory means. The memory means 25 have two or more memory locations for storing, at one memory location, a start position signal of one piece of music of a record carrier incorporated in the cassette. Thus, if the memory means 25 comprise n memory locations, a start position signal can be stored at a memory location in the memory 25 for a maximum number of n cassettes. According to the invention, these are the start positions of a favorite piece of music on each of these record carriers.

Address signal generator means 27 are provided which supply an address signal at an output 30 for supplying this address signal to an address signal input 31 of the memory 25. The generator means 27 are adapted to supply an address signal in conformity with the cassette 14 with record carrier 2 inserted into the device. There are different manners in which the address generator means can generate an address signal in conformity with the inserted cassette. To this end the device of FIG. 1 includes recognition means 28. The recognition means 28 have an input 35 coupled to an output 36 of the memory 6. The recognition means derive the previously mentioned given number of bytes from the table of contents, whereafter the address signal generator applies an address signal in conformity with the inserted cassette to the output 30 by means of a control signal at the lead 36. In response to this address signal applied to the input 31 of the memory 25, the start position signal of the favorite piece of music on the inserted cassette is supplied at the output 37 and applied to the second input 22 of the comparator 20. In the comparator 20 the actual position of the reproducing head, represented by the position signal which is applied to the input 21 by the means 15, is compared with a start position signal as applied to the input 22 by the memory 25. Dependent on the two signals, the comparator 20 generates a control signal at its output 43, which signal is applied to a central processing unit 45 via the lead 42.

If a user of the device has listened to the cassette, he will depress the STOP key on a keyboard 38 associated with the device, whereafter the transport stops. He may subsequently operate the EJECT key so that the cassette is ejected. When the keyboard 38 is operated, control signals are generated which are applied via a lead 40 to the central processing unit 45 which controls the various components in the device in the correct manner in response to these control signals. If the user has listened to the cassette until the end of one side, the record carrier is wound entirely on one of the reels. If the user has depressed the STOP key at an arbitrary moment during reproduction of the cassette, an arbitrary part of the record carrier is wound on the one reel and the rest of the carrier is wound on the other reel. If the cassette is reinserted at a later moment for the purpose of listening to the cassette again and if the PLAY key is depressed, the reproduction starts at a point where it had ended previously. This may mean that the reproduction generally starts at an unwanted point. If the favorite piece of music on this record carrier is to be reproduced first, it will be necessary: to first wind the record carrier towards the start position of this piece of music before the reproduction can be started.

The device further comprises operating means 39 in the form of an additional key FTP on the keyboard 38 with which the device can be switched in an FTP (Favorite Tape Position) mode. The operation of this key 39 generates an activation signal which is also applied to the central processing unit 45 via the lead 40. Now the user can operate the FTP key after he has listened to the cassette. In response thereto, and also in dependence upon the control signal at the lead 42, the processing unit 45 will drive the transport control means 9 in such a way that the record carrier is transported at a raised speed to the start position of the favorite piece of music as represented by the start position signal applied to the comparator 20 by the memory 25. Subsequently, the tape transport is stopped using an arrangement as disclosed in, for example, the above-cited Staar patents, and the cassette can be ejected, possibly automatically Arrangements for automatically ejecting a tape cassette are well known in the art, for example, U.K. Patent Application GB 2,149,189A. Hence, further description thereof is not necessary.

If the cassette is reinserted the next time, the favorite piece of music is exactly positioned opposite the reproducing head so that reproduction can be started immediately.

Programming the memory 25 and the recognition means 28 in such a way that the start position signal of a favorite piece of music on the record carrier in a cassette is stored in the memory 25 and the cassette can be recognized is realized as follows.

During reproduction of a cassette, the sub-code and hence the table of contents of the record carrier 2 is read via the head 1 and stored in the memory 6. If the user wants to store a favorite track number of this record carrier in the memory 25, he should depress the key 51 on the keyboard 38. In response thereto, the central processing unit 45 generates a control signal via the lead 52, which signal is applied to the recognition means 28 which derives the previously mentioned number of bytes characterizing the cassette from the table of contents in response to this control signal. This leads to an address signal at the output 30, which signal is applied to the memory 25. Subsequently the user enters the track number of the favorite piece of music on the numerical section 53 of the keyboard, whereafter he depresses the key 39. The entered track number generates a control signal at the lead 50 for the memory 6, which causes the memory 6 to apply the start position signal in the table of contents associated with the selected piece of music to the output 36. This start position signal is applied to an input 55 of the memory 25 via the lead 54. In response to a load signal which is applied by the central processing unit 45 to the memory 25 via the lead 56, the start position signal is stored in the memory 25 at the location indicated by the address signal of the generator 29. When other cassettes are used, the start position signal can be stored in the memory 25 in the same way.

As already stated in the opening paragraph, the cassette may alternatively be recognized in a different way than described hereinbefore. For example, the catalogue number or another cassette identification code incorporated in the sub-code may be used. An alternative possibility is to detect a coding provided mechanically or optically on the cassette. All these features refer to cases where the cassette is recognized automatically so that the user does not need to carry out a given action for this purpose.

Figure 2:
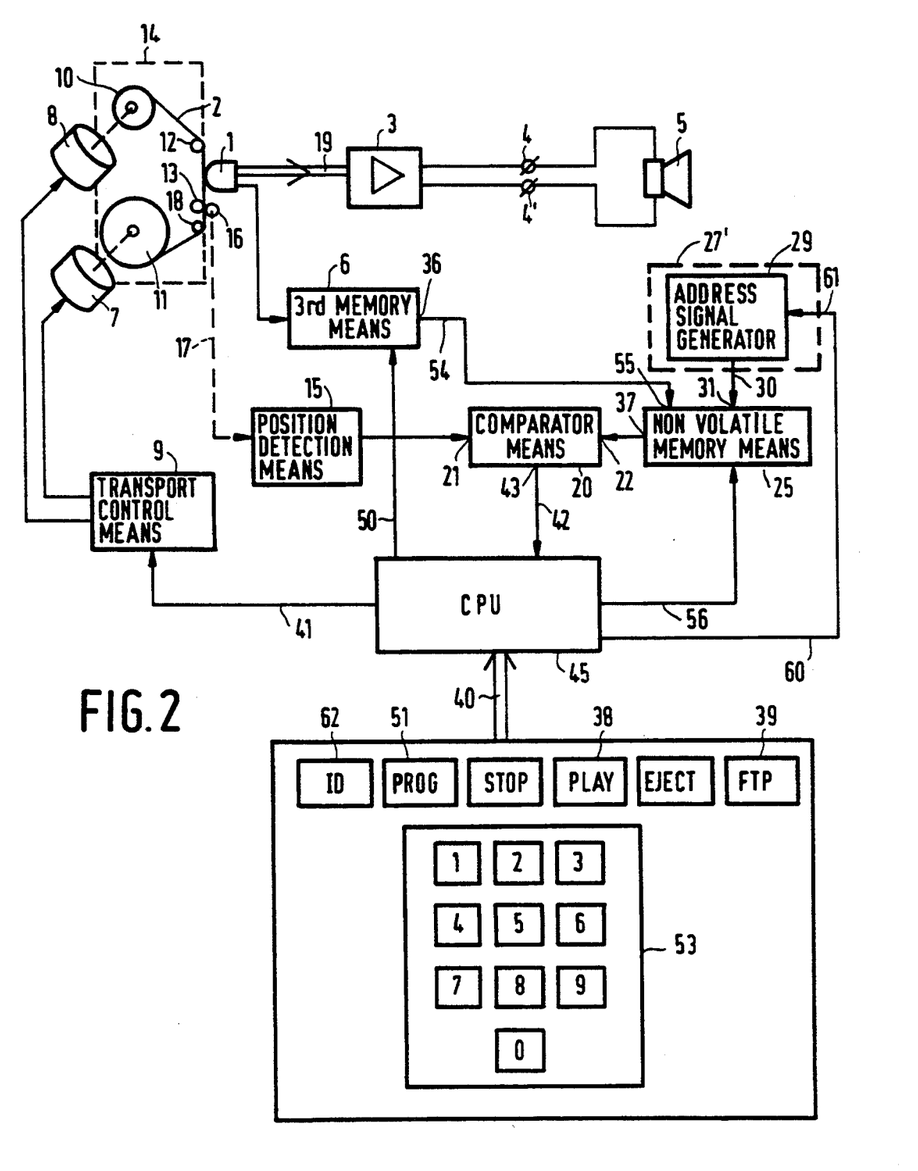
FIG. 2 shows a second embodiment of a reproducing device incorporating the invention.

In a second embodiment, as shown in FIG. 2, the user should carry out an additional action to realize the function of transporting the record carrier to the start position of the favorite piece of music after key 39 has been depressed.

In the embodiment of FIG. 2 the address signal generator means 27' are therefore implemented differently and in this case they are not provided with the recognition means 28 of FIG. 1. A control signal lead 60 is connected between the central processing unit 45 and an input 61 of the generator 27'.

Let it be assumed that the user activates the STOP key on the keyboard 38 after he has listened to a cassette and then wants to wind the tape in the FTP mode to the start position of his favorite piece of music. The user knows which cassette has been inserted into the device and thus he knows which code, for example, an identification number has been previously assigned to this cassette. The user has written this identification number on the cassette by means of, for example, a pen. After he has activated the key 39, the user should subsequently enter the identification number of the cassette by activating the keys of the numerical section 53 on the keyboard. This identification number is subsequently applied to the central processing unit 45 via the lead 40. This unit then derives a control signal at the lead 60 in conformity with the identification number, which signal is applied to the address generator 27'. The address generator 27' generates this control signal accordingly, hence an address at the output 30 in accordance with the identification number. This address indicates the memory location in the memory 25 at which the start position signal of the favorite piece of music on the inserted cassette has been stored. This position signal is applied to the input 22 of the comparator 20. The further mode of operation is subsequently identical to that described with reference to FIG. 1.

In this case the memory 25 is programmed as follows. If the user wants to store a favorite track on a cassette in the memory 25, he has to activate the key 62 on the keyboard 38. The user has already previously assigned a unique identification number to the cassette. For example, identification numbers 1 to n could be used, because a start position signal can be stored in the memory 25 for a maximum number of n cassettes. Subsequently, the user enters the identification number by way of the numerical keys 53. In response thereto, the central processing unit 45 generates a control signal via the lead 60 to the generator 27' after key 51 has subsequently been activated, and the generator derives the previously mentioned address signal from said control signal, which address signal is applied to the memory 25 via the output 30. Subsequently the user enters the track number of the favorite piece of music on the numerical section 53 of the keyboard, whereafter he activates the key 39. The entered track number generates a control signal at the lead 50 for the memory 6 which causes the memory 6 to apply the start position signal in the table of contents associated with the selected piece of music to the output 36. This start position signal is applied to an input 55 of the memory 25 via the lead 54. In response to a load signal which is applied by the central processing unit 45 to the memory 25 via the lead 56, the start position signal is stored in the memory 25 at the location indicated by the address signal of the generator 27'.

Figure 3:
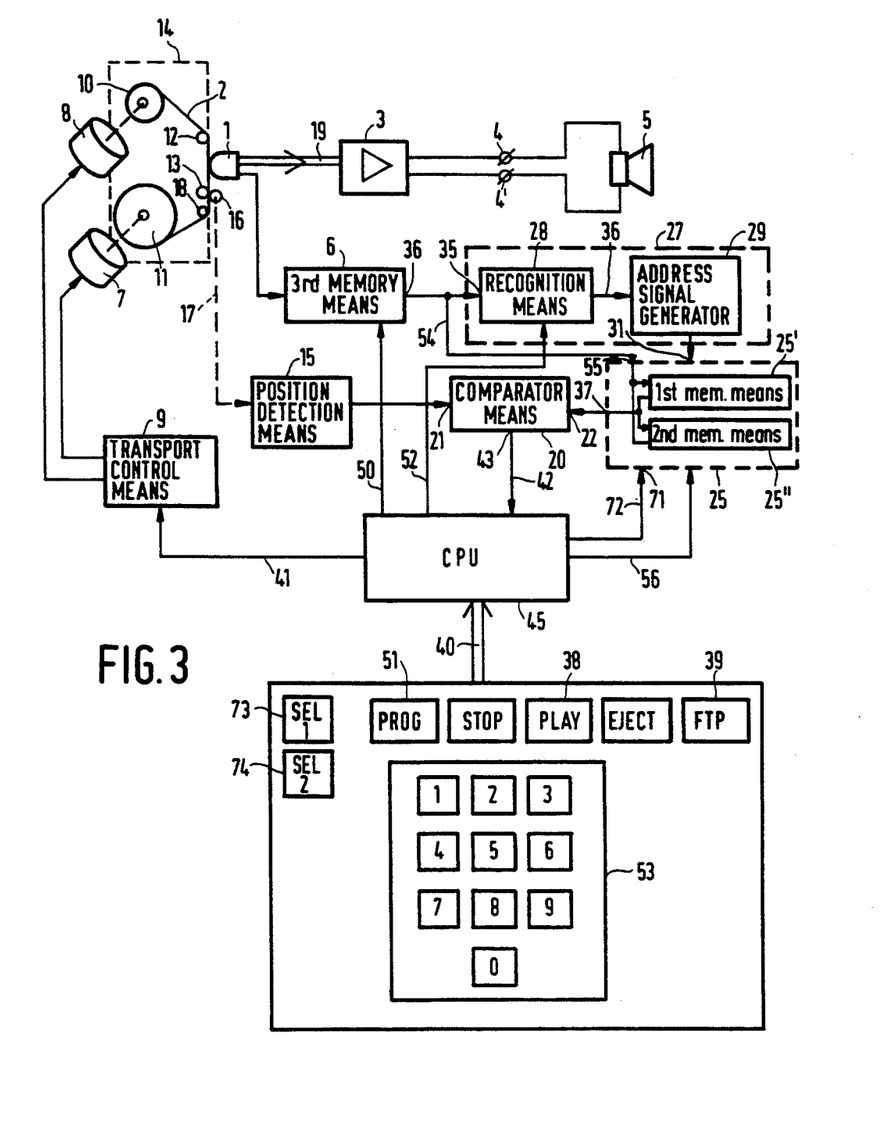
FIG. 3 shows a third embodiment of the reproducing device.

FIG. 3 shows a third embodiment in which the device of FIG. 1 further comprises second non-volatile memory means. FIG. 3 shows the non-volatile memory means 25 comprising the first non-volatile memory means 25' and the second non-volatile memory means 25". The address signal of the address generator 29 is applied to the two memories 25' and 25" via the input 31 for addressing a memory location in the two memories. The input 55 of the memory means 25 is further coupled to an input of the two memories 25' and 25". The load signal which is applied to the memory means 25 via the lead 56 is applied to the first memory 25' as well as to the second memory 25". A first or a second selection signal is generated by the central processing unit 45 after the user has activated the key 73 or the key 74, respectively. The first or the second selection signal is applied to an input 71 of the memory means 25 via the lead 72. Under the influence of the selection signal one of the two memories 25' or 25" is selected with the aid of selection means (not shown) associated with the memory means.

A first user will program as follows. Programming is mainly performed in the way as described with reference to FIG. 1. However, the user should activate the key 73 first. Activation of the key 73 actually indicates that the first user's favorite pieces of music have been-/are being stored in the memory 25'. The device thus knows that the user wants to store a favorite start position in the first memory. Subsequently the user activates the key 51 and the procedure is further carried out in the manner as described with reference to FIG. 1. If a second user wants to program the device, he should activate the key 74 and then the key 51 whereafter the procedure is carried out in the manner described. The selection signal which is applied to the input 71 thus selects one of the two memories so that in response to the load signal applied to the two memories the start position signal at the input 55 is stored in the selected memory at a memory location in conformity with the address generated by the generator 29.

If the first user has listened to a cassette and if he wants to switch the device to the FTP mode so as to cause the record carrier to be wound to the start of the favorite piece of music before he takes out the cassette, he should also activate the key 73 first, whereafter the procedure is again carded out in the way as described with reference to FIG. 1. If the second user wants to switch on the FTP mode, he will do so in the same way by first activating the key 74 instead of the key 73. By activating the key 73 or 74 the central processing unit 45 generates a first or a second selection signal, respectively, which is applied to the memory means 25 via the lead 72. In response to this selection signal and the address signal one of the two memories 25' or 25" will apply a start position signal to the output 37. The two memories may be selected, for example, by coupling the outputs of the memories 25'0 and 25" to the output 37 via selection means in the form of a multiplexer (not shown). The selection signal is then applied to a control signal input of this multiplexer which passes on the start position signal applied to the multiplexer by the memory 25' or the memory 25" to the output 37 in response to the first or the second selection signal. An alternative possibility is to couple the outputs of the two memories 25' and 25" to the output 37 directly. In response to the first or the second selection signal, which is applied to the first or the second memory in this case, the first (or, conversely, the second) memory is activated and the second (or, conversely, the first) memory is deactivated so that the start position signal at the output of the memory 25' (or, conversely, the memory 25") is applied to the output 37 of the memory means 25.

If implemented as autoreverse devices, the devices described may be further extended in that the reproduction of subsequent pieces of music on the record carrier is continued after the favorite piece of music has been played. If the end of one side of the record carrier has been reached, it is possible to switch over to reproduction on the other side by means of an autoreverse action. Subsequently, this side is entirely played until there is a subsequent autoreverse action at the end of this side and the device starts reproducing the side on which the favorite piece of music has been recorded. At the instant when the start position of the favorite piece of music is reached, the comparator means 20 generate a stop signal which is applied to the central processing unit 45 via the lead 42. In response to this signal the tape transport can be switched off and the cassette may be ejected.

I claim:

1. A device for reproducing a piece of music from a track on a magnetic record carrier incorporated in a cassette, comprising:

reading means for reading the piece of music from the track at a reproduction speed, said reading means including a reproducing head;

position detection means for detecting a position of the reproducing head with respect to the record carrier, viewed in the longitudinal direction of said record carrier, and for supplying a position signal which is related to said position;

comparator means, having a first input, a second input and an output, for comparing the position signal from said position detection means, applied to the first input, with a start position signal which is related to a start position of a piece of music on the record carrier and which is applied to the second input, and for supplying a control signal at the output in dependence upon the position signal and the start position signal;

transport control means for transporting the record carrier along the reproducing head, in a reproduction mode, at the reproduction speed, and for transporting the record carrier, in a second mode, at a raised transport speed in response to the control signal of the comparator means to such a position that the reproducing head is situated substantially at the start position of the piece of music, characterized in that the device further comprises:

non-volatile memory means for storing, for two or more record carriers, the start position signal for one piece of music on each one of said record carriers;

operating means for generating an activation signal upon operation of the operating means;

address signal generator means adapted to generate an address signal in accordance with the record carrier inserted into the device for supplying the address signal to the memory means, in that the memory means are adapted to supply the start position signal at an output in response to the address signal, said start position signal being stored in the memory means for said one piece of music on the record carrier inserted into the device, in that the output of the memory means is coupled to the second input of the comparator means for supplying the start position signal to the comparator means, and in that the transport control means are adapted to transport the record carrier at the raised transport speed to the start position of the piece of music in response to the control signal of the comparator means and in response to the activation signal, and to switch off the transport after the start position of the piece of music has been reached, and to switch the device over to a stop mode.

2. A device as claimed in claim 1, characterized in that the device further comprises means for ejecting the cassette in response to the activation signal after said transport control means has switched off the transport after the start position of the piece of music has been reached.

3. A device as claimed in claim 1, characterized in that the address signal generator means comprise recognition means adapted to recognize the record carrier inserted into the device and to generate an address signal in conformity with the record carrier recognized by the recognition means.

4. A device as claimed in claim 1, characterized in that the non-volatile memory means comprises:
- a first non-volatile memory section for storing, for said two or more record carriers, the start position signal for one piece of music on each one of said record carriers;
- a second non-volatile memory section also for storing, for two or more record carriers, a start position signal for one piece of music on each one of said record carriers, said first and second non-volatile memory sections being adapted to supply, in response to the address signal, the start position signal at an output for the one piece of music, referred to as first or second piece of music, respectively, on the record carrier inserted into the device, in that the device further comprises:
- selection signal generator means having an output for supplying a first or a second selection signal; and
- selection means, having an input couplet to the output of said selection signal generator means, said selection means being adapted to supply the start position signal at the output of the non-volatile memory means stored in the first or the second non-volatile memory section in response to the first or the second selection signal, respectively.

5. A device as claimed in claim 4, characterized in that the device comprises:
- a further non-volatile memory means for storing a table of contents comprising information about the sequence of pieces of music on a record carrier inserted into the device, and start position signals which are related to the start positions of the pieces of music on the record carrier, said further non-volatile memory means having an output which is coupled to an input of the non-volatile memory means;
- second operating means for generating a selection signal upon operation of said operating means, said selection signal being related to the information about the sequence associated with one of the pieces of music on the record carrier, and for supplying said selection signal to the further non-volatile memory means, in that the further non-volatile memory means are adapted to supply the start position signal of one of the pieces of music at the output in response to the selection signal and in that the non-volatile memory means are adapted to store, in response to a load signal, the start position signal at a location in the non-volatile memory means which corresponds to the address signal of the address signal generator means.

6. A device as claimed in claim 5, characterized in that the non-volatile memory means are adapted to store the start position signal in the selected first or second non-volatile memory section in response to the load signal, and the first or the second selection signal, respectively.

7. A device as claimed in claim 2, characterized in that the address signal generator means comprise recognition means adapted to recognize the record carrier inserted into the device and to generate an address signal in conformity with the record carrier recognized by the recognition means.

8. A device as claimed in claim 2, characterized in that the non-volatile memory means comprises:
- a first non-volatile memory section for storing, for said two or more record carriers, the start position signal for one piece of music on each one of said record carriers;
- a second non-volatile memory section also for storing, for two or more record carriers, a start position signal for one piece of music on each one of said record carriers, said first and second non-volatile memory sections being adapted to supply, in response to the address signal, the start position signal at an output for the one piece of music, referred to as first or second piece of music, respectively, on the record carrier inserted into the device, in that the device further comprises:
- selection signal generator means having an output for supplying a first or a second selection signal; and
- selection means, having an input coupled to the output of said selection signal generator means, said selection means being adapted to supply the start position signal at the output of the non-volatile memory means stored in the first or the second non-volatile memory section in response to the first or the second selection signal, respectively.

9. A device as claimed in claim 3, characterized in that the non-volatile memory means comprises:
- a first non-volatile memory section for storing, for said two or more record carriers, the start position signal for one piece of music on each one of said record carriers;
- a second non-volatile memory section also for storing, for two or more record carriers, a start position signal for one piece of music on each one of said record carriers, said first and second non-volatile memory sections being adapted to supply, in response to the address signal, the start position signal at an output for the one piece of music, referred to as first or second piece of music, respectively, on the record carrier inserted into the device, in that the device further comprises:
- selection signal generator means having an output for supplying a first or a second selection signal; and
- selection means, having an input coupled to the output of said selection signal generator means, said selection means being adapted to supply the start position signal at the output of the non-volatile memory means stored in the first or the second non-volatile memory section in response to the first or the second selection signal, respectively.

10. A device as claimed in claim 7, characterized in that the non-volatile memory means comprises:
a first non-volatile memory section for storing, for said two or more record carriers, the start position signal for one piece of music on each one of said record carriers;
a second non-volatile memory section also for storing, for two or more record carriers, a start position signal for one piece of music on each one of said record carriers, said first and second non-volatile memory sections being adapted to supply, in response to the address signal, the start position signal at an output for the one piece of music, referred to as first or second piece of music, respectively, on the record carrier inserted into the device, in that the device further comprises:
selection signal generator means having an output for supplying a first or a second selection signal; and
selection means, having an input coupled to the output of said selection signal generator means, said selection means being adapted to supply the start position signal at the output of the non-volatile memory means stored in the first or the second non-volatile memory section in response to the first or the second selection signal, respectively.

11. A device as claimed in claim 1, characterized in that the device comprises:
a further non-volatile memory means for storing a table of contents comprising information about the sequence of pieces of music on a record carrier inserted into the device, and start position signals which are related to the start positions of the pieces of music on the record carrier, said further non-volatile memory means having an output which is coupled to an input of the non-volatile memory means;
second operating means for generating a selection signal upon operation of said operating means, said selection signal being related to the information about the sequence associated with one of the pieces of music on the record carrier, and for supplying said selection signal to the further non-volatile memory means, in that the further non-volatile memory means are adapted to supply the start position signal of one of the pieces of music at the output in response to the selection signal and in that the non-volatile memory means are adapted to store, in response to a load signal, the start position signal at a location in the non-volatile memory means which corresponds to the address signal of the address signal generator means.

12. A device as claimed in claim 2, characterized in that the device comprises:
a further non-volatile memory means for storing a table of contents comprising information about the sequence of pieces of music on a record carrier inserted into the device, and start position signals which are related to the start positions of the pieces of music on the record carrier, said further non-volatile memory means having an output which is coupled to an input of the non-volatile memory means;
second operating means for generating a selection signal upon operation of said operating means, said selection signal being related to the information about the sequence associated with one of the pieces of music on the record carrier, and for supplying said selection signal to the further non-volatile memory means, in that the further non-volatile memory means are adapted to supply the start position signal of one of the pieces of music at the output in response to the selection signal and in that the non-volatile memory means are adapted to store, in response to a load signal, the start position signal at a location in the non-volatile memory means which corresponds to the address signal of the address signal generator means.

13. A device as claimed in claim 3, characterized in that the device comprises:
a further non-volatile memory means for storing a table of contents comprising information about the sequence of pieces of music on a record carrier inserted into the device, and start position signals which are related to the start positions of the pieces of music on the record carrier, said further non-volatile memory means having an output which is coupled to an input of the non-volatile memory means;
second operating means for generating a selection signal upon operation of said operating means, said selection signal being related to the information about the sequence associated with one of the pieces of music on the record carrier, and for supplying said selection signal to the further non-volatile memory means, in that the further non-volatile memory means are adapted to supply the start position signal of one of the pieces of music at the output in response to the selection signal and in that the non-volatile memory means are adapted to store, in response to a load signal, the start position signal at a location in the non-volatile memory means which corresponds to the address signal of the address signal generator means.

14. A device as claimed in claim 7, characterized in that the device comprises:
a further non-volatile memory means for storing a table of contents comprising information about the sequence of pieces of music on a record carrier inserted into the device, and start position signals which are related to the start positions of the pieces of music on the record carrier, said further non-volatile memory means having an output which is coupled to an input of the non-volatile memory means;
second operating means for generating a selection signal upon operation of said operating means, said selection signal being related to the information about the sequence associated with one of the pieces of music on the record carrier, and for supplying said selection signal to the further non-volatile memory means, in that the further non-volatile memory means are adapted to supply the start position signal of one of the pieces of music at the output in response to the selection signal and in that the non-volatile memory means are adapted to store, in response to a load signal, the start position signal at a location in the non-volatile memory means which corresponds to the address signal of the address signal generator means.

15. A device as claimed in claim 8, characterized in that the device comprises:
a further non-volatile memory means for storing a table of contents comprising information about the sequence of pieces of music on a record carrier inserted into the device, and start position signals which are related to the start positions of the pieces of music on the record carrier, said further non-volatile memory means having an output which is coupled to an input of the non-volatile memory means;

second operating means for generating a selection signal upon operation of said operating means, said selection signal being related to the information about the sequence associated with one of the pieces of music on the record carrier, and for supplying said selection signal to the further non-volatile memory means, in that the further non-volatile memory means are adapted to supply the start position signal of one of the pieces of music at the output in response to the selection signal and in that the non-volatile memory means are adapted to store, in response to a load signal, the start position signal at a location in the non-volatile memory means which corresponds to the address signal of the address signal generator means.

16. A device as claimed in claim 15, characterized in that the non-volatile memory means are adapted to store the start position signal in the selected first or second non-volatile memory section in response to the load signal, and the first or the second selection signal, respectively.

17. A device as claimed in claim 9, characterized in that the device comprises:

a further non-volatile memory means for storing a table of contents comprising information about the sequence of pieces of music on a record carrier inserted into the device, and start position signals which are related to the start positions of the pieces of music on the record carrier, said further non-volatile memory means having an output which is coupled to an input of the non-volatile memory means;

second operating means for generating a selection signal upon operation of said operating means, said selection signal being related to the information about the sequence associated with one of the pieces of music on the record carrier, and for supplying said selection signal to the further non-volatile memory means, in that the further non-volatile memory means are adapted to supply the start position signal of one of the pieces of music at the output in response to the selection signal and in that the non-volatile memory means are adapted to store, in response to a load signal, the start position signal at a location in the non-volatile memory means which corresponds to the address signal of the address signal generator means.

18. A device as claimed in claim 17, characterized in that the non-volatile memory means are adapted to store the start position signal in the selected first or second non-volatile memory section in response to the load signal and the first or the second selection signal, respectively.

19. A device as claimed in claim 10, characterized in that the device comprises:

a further non-volatile memory means for storing a table of contents comprising information about the sequence of pieces of music on a record carrier inserted into the device, and start position signals which are related to the start positions of the pieces of music on the record carrier, said further non-volatile memory means having an output which is coupled to an input of the non-volatile memory means;

second operating means for generating a selection signal upon operation of said operating means, said selection signal being related to the information about the sequence associated with one of the pieces of music on the record carrier, and for supplying said selection signal to the further non-volatile memory means, in that the further non-volatile memory means are adapted to supply the start position signal of one of the pieces of music at the output in response to the selection signal and in that the non-volatile memory means are adapted to store, in response to a load signal, the start position signal at a location in the non-volatile memory means which corresponds to the address signal of the address signal generator means.

20. A device as claimed in claim 19, characterized in that the non-volatile memory means are adapted to store the start position signal in the selected first or second non-volatile memory section in response to the load signal and the first or the second selection signal, respectively.

21. A device for reproducing a piece of music from a track on a magnetic record carrier incorporated in a cassette, comprising:

reading means for reading the piece of music from the track at a reproduction speed, said reading means including a reproducing head;

position detection means for detecting a position of the reproducing head with respect to the record carrier, viewed in the longitudinal direction of said record carrier, and for supplying a position signal which is related to said position;

comparator means, having a first input, a second input and an output, for comparing the position signal from said position detection means, applied to the first input, with a start position signal which is related to a start position of a piece of music on the record carrier and which is applied to the second input, and for supplying a control signal at the output in dependence upon the position signal and the start position signal;

transport control means for transporting the record carrier along the reproducing head, in a reproduction mode, at the reproduction speed, and for transporting the record carrier, in a second mode, at a raised transport speed in response to the control signal of the comparator means to such a position that the reproducing head is situated substantially at the start position of the piece of music, characterized in that the device further comprises:

non-volatile memory means for storing, for two or more record carriers, an information signal having a relation to a start position for one piece of music on each of said record carriers;

operating means for generating an activation signal after termination of a reproduction mode in the device;

address signal generator means adapted to generate an address signal in accordance with the record carrier inserted into the device for supplying the address signal to the memory means;

start position supply means coupled to the non-volatile memory means and the operating means for supplying a start position signal in response to the activation signal, in that the start position supply means is coupled to the second input of the comparator means for supplying the start position signal to the comparator means, and in that the transport control means are adapted to transport the record carrier at the raised transport speed to the start position of the piece of music in response to the control signal of the comparator means and in response to the activation signal, and to switch off the transport after the start position of the piece of music has been reached.

* * * * *